UNITED STATES PATENT OFFICE.

MORITZ BLUMENTHAL, OF GRUNAU, NEAR BERLIN, PRUSSIA, GERMANY.

ORGANIC FERMENTS, (NON-ORGANIZED.)

SPECIFICATION forming part of Letters Patent No. 344,433, dated June 29, 1886.

Application filed June 11, 1885. Serial No. 168,400. (No specimens.) Patented in Belgium May 4, 1885, No. 68,754; in France May 4, 1885, No. 168,675; in England May 4, 1885, No. 5,483; in Sweden May 4, 1885, No. 220; in Germany May 5, 1885, No. 34,043; in Luxemburg May 5, 1885, No. 527; in Canada July 9, 1885, No. 22,047, and in Spain September 2, 1885, No. 5,040.

*To all whom it may concern:*

Be it known that I, MORITZ BLUMENTHAL, doctor of philosophy, a subject of the King of Prussia, residing at Grunau, near Berlin, Prussia, German Empire, have invented certain new and useful Improvements in Pure Non-Organized Ferments, (for which I have obtained Letters Patent in Belgium, No. 68,754, dated May 4, 1885; in France, No. 168,675, dated May 4, 1885; in England, No. 5,483, dated May 4, 1885; in Sweden, No. 220, dated May 4, 1885; in Germany, No. 34,043, dated May 5, 1885; in Luxemburg, No. 527, dated May 5, 1885; in Canada, No. 22,047, dated July 9, 1885, and in Spain, No. 5,040, dated September 2, 1885;) and I do hereby declare the following to be a full, clear, and exact description of the invention, such as will enable others skilled in the art to which it appertains to make and use the same.

In organic chemistry that class of products which I may term "zymotic products" are now known under the generic title of "enzymæ," a word derived from the Greek en, "in," and zumoun, "ferment," or "inner ferment," if I may so call it, to which products belong pepsin or gasterase, one of the active agents of digestion that assists, in conjunction with pancreatin, to produce the necessary reactions in the food, and results in what is called "digestion." This active principle or agent of digestion has also been known under the name of "chymosin," though pepsin and chymosin are two different agents having unlike properties. For instance, pepsin, when employed in the manufacture of cheese to curdle milk, has no effect upon the milk, while the chymosin is the effective agent that reacts upon the milk and causes it to curdle.

Pepsin—that is, the compound of pepsin and chymosin—has been for some time extensively used for medicinal and other purposes; but before my invention this product has not been obtained in an uncombined state; nor is that product known as "pepsin" or "rennet" found in commerce, even a pure compound of pepsin and chymosin being usually combined with impurities, chiefly with albuminous and mucous matter in large proportions, that will cause its solution to rapidly decompose, and impart to the product an offensive smell and taste, and render it valueless for many purposes.

This invention relates, therefore, to new articles of manufacture and commerce, generically called "enzymæ," or "zymotic" agents or products, more especially to pepsin and chymosin practically free from mucous, albuminous and other impurities.

The two products as obtained by me are nearly odorless and tasteless. They are perfectly soluble in water and form tasteless, odorless, and clear or limpid solutions that do not readily decompose. They may be preserved for a long time either in a fluid or dry state without deterioration and under varying climatic influences without impairing their properties. Even at temperatures as high as 35° centigrade, they may be kept in good condition for a long time. If desired, a neutral preservative—such as an alkali soluble in water—may be mixed therewith, or sugar, as will hereinafter appear.

The invention consists in new products or articles of commerce and manufacture—namely, pepsin and chymosin uncombined with each other, and practically free from foreign substances, as hereinafter fully described. These products or zymotic agents may be obtained by any suitable process, or by the process which I shall presently describe, but which I do not desire to claim in this application, as I have claimed the same in a separate application, on which Letters Patent of the United States have been granted to me under date of March 23, 1886, No. 338,471.

I have found that chymosin, the active agent in milk, may be obtained from rennet or the stomachs of ruminants, and more especially that of the calf, which contains comparatively little pepsin, the chymosin preponderating. In the stomach of the pig or sheep, on the other hand, I have found that pepsin preponderates. Hence, if the chief product is to be chymosin, it will be found of advantage to employ the stomach or rennet of the calf as a raw material, and if pepsin is to be the chief product it will be of greater advantage to employ the stomach or rennet of the pig or sheep.

The treatment of the raw material being the same whether the stomach of the pig or that of the calf, or other ruminant is employed, I will confine this description to the treatment of the stomach of the calf with a view to obtaining chymosin as a principal and pepsin as a by-product. The stomach of the calf is cut into small pieces and macerated or digested for about twenty-four hours in a solution preferably of common cooking-salt, containing about 0.5 per cent. of salt, kept at a temperature of 30° centigrade, more or less. The solution is then filtered, and a small amount of mineral acid mixed therewith—such as hydrochloric, sulphuric, or phosphoric acid—in the proportion of about 0.1 per cent. The reaction of the acid on the saline solution gives rise to a thick precipitate of mucous matter, which contains but traces of chymosin and no pepsin, the solution during the acidulation being preferably kept at a temperature of about 20° to 30° centigrade, as at that temperature the mucous matter agglomerates more rapidly or readily, and may in this condition be easily separated from the solution, which is effected only with the greatest difficulty otherwise. The filtered solution is again acidulated to the extent of about 0.5 per cent. of acid, and pulverized cooking-salt is added until a precipitate of the latter is formed. This supersaturated acidulated salt solution is now brought to a temperature of 25° to 30° centigrade and kept at this temperature for two or three days under constant agitation, and then allowed to rest for a day or so, the temperature being increased to 30° or 35° centigrade. A separation then takes place in the form of a white flocculent substance, which floats on or in the solution, and may be readily collected on a filter, and then dried at a temperature of about 28° centigrade. The substance separated from the solution is the pure zymotic product called "chymosin." It is an amorphous white gelatinous substance greatly resembling hydrate of alumina, is without taste or smell, and soluble in water, forming a limpid or clear solution. It may be kept for years without deterioration, and is not injured by temperatures reaching as high as 35° centigrade. The remaining salt-supersaturated acid-liquor or mother-lye free from chymosin does not cause milk to curdle when mixed therewith, the active agent chymosin, which alone produces this reaction in milk having been eliminated. The pepsin held in solution in this mother-liquor or lye may now be separated therefrom by neutralizing the solution with an alkali and agitating the same for some time, the pepsin being obtained as a gelatinous precipitate insoluble in the concentrated neutral-salt solution, but soluble in the acid-salt solution.

Pure pepsin may also be obtained from the so-called "impure pepsin essences," or "extracts of rennet of commerce," by acidulating these extracts or the solutions of the dry rennet with one of the mineral acids above referred to in the proportion of about 0.2 per cent. of the acid, whereby the impurities are precipitated. These are removed by filtration, an excess of cooking-salt added, as described, to separate the chymosin which is collected, and the remaining solution is neutralized to precipitate therefrom the pepsin. In this case also chymosin and pepsin are separately obtained free from any albuminous or mucous and other impurities.

Having now described my invention, what I claim, and desire to secure by Letters Patent, is—

1. The herein-described zymotic product, consisting of chymosin uncombined with pepsin, as described.

2. The herein-described zymotic product, consisting of pepsin uncombined with chymosin, as described.

3. The herein-described enzymæ or zymotic products—such as chymosin and pepsin uncombined with each other—in combination with an indifferent preservative—such as common salt or its equivalent—as described.

In testimony whereof I affix my signature in presence of two witnesses.

MORITZ BLUMENTHAL.

Witnesses:
A. DEMELIUS,
B. ROI.